United States Patent Office 3,212,575
Patented Oct. 19, 1965

3,212,575
USE OF N-ACYL SARCOSINES IN
MISCIBLE FLOODING
Henry B. Fisher and Dixon W. Peacock, Bartlesville,
Okla., assignors to Phillips Petroleum Company, a corporation of Delaware
No Drawing. Filed Mar. 12, 1962, Ser. No. 179,225
8 Claims. (Cl. 166—9)

This invention relates to the recovery of petroleum by a miscible fluid flood. In another aspect the invention relates to a miscible fluid flood in which an oil-soluble surfactant is contained in the miscible flooding agent. In another aspect the invention relates to a miscible fluid flood in which an oil-soluble surfactant is contained in the miscible flooding agent and water is used to displace the agent through the reservoir. In another aspect, the invention relates to improved miscible flooding agent comprising an oil-soluble surfactant and a hydrocarbon solvent.

Secondary recovery of petroleum from underground reservoirs by flooding the reservoirs with a miscible flooding agent has undergone extensive development and trial. For an efficient flooding operation, it is important that the contained petroleum fluids in the reservoir be displaced as completely as possible, and that as large a portion of the miscible agent as possible be recovered. A factor in the efficient displacement of the petroleum fluids is the displacement of connate water from the reservoir by the flooding agent, thereby releasing a larger portion of the contained petroleum fluids. In many instances natural gas is utilized as the miscible agent displacement fluid. However, because of its cost, and because high reservoir pressures must be maintained to maintain miscibility with the miscible flooding agent, and because of its low viscosity, which tends to lower reservoir sweep efficiencies, it is highly desirable to utilize water as a substitute for the gas as a final driving fluid. Water is relatively cheap and has a viscosity (or mobility) which can lead to more favorable reservoir sweep efficiencies. Lack of miscibility with the usual flooding agents, such as liquefied petroleum gas (L.P.G.), however, obviates the use of a simple water drive because of the high residual saturation of the miscible flooding agent.

An object of this invention is to increase the displacement of contained petroleum fluids in a miscible fluid flood.

Another object of this invention is to obtain minimum flooding agent residual saturation in a miscible fluid flood.

Other aspects, objects and the advantages of our invention are apparent in the written description, the drawing and the claims.

According to our invention, petroleum is recovered from an underground reservoir by injecting a slug of a miscible flooding agent containing a surfactant in solution, and driving the flooding agent through the reservoir to recover the contained petroleum and flooding agent by following with a quantity of water. A miscible fluid flood normally involves injecting 3 to 10 percent of a pore volume of L.P.G. or its constituents into a reservoir and displacing the slug to the producing well by means of the final gas drive. According to our invention water is substituted for the gas as the final drive and an oil-soluble surfactant is used in the flooding agent to increase the displacement of connate water, and thus increase the production of petroleum fluids, while still maintaining a desirable level of flooding agent residual saturation, resulting in economical operation of the process.

Further, according to our invention, from .001 to 2 weight percent, preferably .01 to 0.1 weight percent, of a hydrocarbon soluble surfactant is added to the miscible flooding agent. A particularly useful surfactant of this type is a commercial surfactant, Sarkosyl-O, of Geigy Industrial Chemicals, which contains oleoyl sarcosine as the active ingredient, the active ingredient being contained as 95 percent and over in the surfactant composition.

Other related surfactants comprising N-acyl sarcosines also are valuable in the practice of our invention, as for example, lauroyl sarcosine, cocyl sarcosine, and stearoyl sarcosine.

Further, according to our invention, there are provided improved miscible flooding agents comprising a hydrocarbon solvent and an oil-soluble surfactant. Preferred flooding agents include one of the N-acyl sarcosines, especially N-oleoyl sarcosine, dissolved in a hydrocarbon solvent, preferably from .01 to 0.1 weight percent of the flooding agent being the surfactant.

Other specific surfactants found to be useful include reaction products of nonyl phenol and ethylene oxide of the type

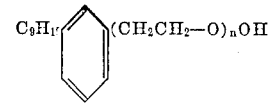

specifically Igepal CO-610 of Antara Chemicals in which $n=7-9$; reaction products of tertiary t-octyl phenol and ethylene oxide, of the type

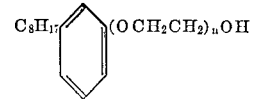

specifically Triton X-45 of Rohm & Haas, in which $n=5$; a substituted oxazoline such as Alkaterge-C of Commercial Solvents; products comprising organic esters of phosphate, such as Victamul 89 of Victor Chemical Co.; and Agent TEF-1 of American Cyanamid, a composition of tall oil and ethanolamide and ethylene oxide.

The following block diagram illustrates the process of our invention:

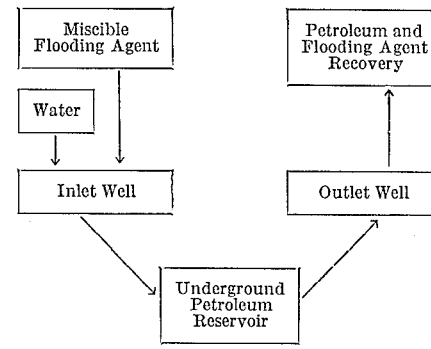

As shown in this diagram, a miscible flooding agent is injected into the reservoir through an injection well. The flooding agent contains a surfactant in solution, as explained above. Following the injection of the flooding agent in the desired amount, water is injected into the input well to drive the flooding agent through the reservoir. The contained petroleum and the flooding agent are recovered from an output well of the reservoir.

In the following examples flooding was performed in a sand-packed tube, the tube being one inch in diameter and 30 inches long. Flooding liquids were pumped at a known constant rate with a positive displacement pump through the sand pack to a separator. The effluent liquids were collected and measured in graduated cylinders. The water phase was deionized water, while the oil phase was n-heptane or a solution of surfactant in n-heptane. 120–130 mesh sand, well packed, was used in the column while flooding rates of 32 cc. per hour for the solvent flood and 10 cc. per hour for the water flood produced a satisfactory balance of viscous and capillary forces in the sand pack. An upstream pressure of 12.5 p.s.i. was maintained throughout the tests.

To minimize the effects of gravity, the flooding was performed in vertical columns and the water was flooded upwardly and the heptane downwardly. The dry weighed column was saturated by evacuating and flooding slowly with acetone under reduced pressure so that any trapped air was replaced by water-soluble vapors. This was followed by a large quantity of water, more than enough to remove all of the acetone. The water-saturated column was weighed and the pore volume calculated from the increase in weight. Permeability was calculated by adjusting the positive displacement pump to deliver at a known rate to the column while measuring the pressure drop across the sand pack. The water-saturated column was flooded with the heptane, or with the solution of surfactant in heptane, until water production stopped, to establish the heptane saturation. Saturations in all instances were determined by measuring the volumes of the produced fluids. Following the establishment of heptane saturation, the column was water flooded until no more heptane was produced. The volumes of produced fluids were again measured and the saturation was calculated. Table I shows flooding rates, surfactants used and data obtained.

*Table I*

| Sand | K Darcys | Pore Volume, cc. | $C_7$ Flood Rate, cc./hr. | $C_7$ Saturation Cc. | $C_7$ Saturation Percent P.V. | Water Flood Rate, cc./hr. | $C_7$ Residual Cc. | $C_7$ Residual Percent P.V. | $C_7$ Recovery Cc. | $C_7$ Recovery Percent | Surfactant |
|---|---|---|---|---|---|---|---|---|---|---|---|
| 120–230 | 0.85 | 156 | 32 | 100 | 64.2 | 10 | 26.5 | 17 | 73.5 | 73.5 | |
| 120–230 | 0.85 | 156 | 32 | 122 | 78.2 | 10 | 24.5 | 15.7 | 98 | 80 | Triton X–45. |
| 120–230 | 0.85 | 156 | 32 | 114 | 73.3 | 10 | 29.8 | 19.1 | 84.2 | 74 | Igepal CO–610. |
| 120–230 | 0.85 | 156 | 32 | 142 | 91.0 | 10 | 20.4 | 13.1 | 121.6 | 85.5 | Sarkosyl-O. |
| 120–230 | 0.85 | 156 | 32 | 114 | 73.3 | 10 | 29.0 | 18.6 | 85 | 74.5 | Alkaterge-C. |
| 120–230 | 0.85 | 156 | 32 | 90 | 57.7 | 10 | 25.9 | 16.6 | 64 | 71 | |
| 120–230 | 0.85 | 156 | 32 | 118.2 | 75.8 | 10 | 27.2 | 17.4 | 91 | 76 | Victamul-89. |
| 120–230 | 0.85 | 156 | 32 | 132 | 84.7 | 10 | 28 | 17.9 | 104 | 79 | Agent TEF-1. |

From the data of Table I it is seen that in all instances the surfactants enabled a higher heptane saturation to be obtained, thus indicating more complete displacement of connate water which is favorable to more complete recovery of petroleum products in the reservoir. The increased heptane saturation was obtained with a slight increase in residual heptane saturation in three instances, no appreciable increase or decrease in two instances. It is noted that use of one of the surfactants, Sarkosyl-O resulted in a very greatly increased heptane saturation and at the same time a significantly decreased residual saturation, indicating a very substantial increase both in petroleum recovery and recovery of miscible flooding agent.

In this application, the expression "miscible flooding" is used to mean one in which the displacement of the oil in place is accomplished by the use of a flooding agent which is miscible with the oil.

Reasonable modification and variation are possible within the scope of our invention which sets forth a process for producing petroleum from an underground reservoir by miscible flooding, including use of an oil soluble surfactant in the flooding agent and improved miscible flooding agents, comprising a hydrocarbon solvent and an oil soluble surfactant.

We claim:

1. A process for recovering petroleum from an underground reservoir comprising the steps of:
    injecting into an injection well a volume of a flooding agent miscible with said petroleum in the range of 3 to 10 percent of the swept pore volume of said reservoir, said flooding agent containing from .001 to 2 weight percent of an N-acyl sarcosine in solution therein;
    driving said flooding agent through said reservoir to an output well by injecting a quantity of water sufficient to drive said flooding agent to said output well; and
    recovering petroleum and said flooding agent from said output well.

2. The process of claim 1 wherein said flooding agent contains from .01 to 0.1 weight percent of an N-acyl sarcosine.

3. A process for recovering petroleum from an underground reservoir comprising the steps of:
    injecting into an injection well a volume of a flooding agent miscible with said petroleum in the range of 3 to 10 percent of the swept pore volume of said reservoir, said flooding agent containing from .001 to 2 weight percent of an oil-soluble surfactant selected from the group consisting of lauroyl sarcosine, cocoyl sarcosine, stearoyl sarcosine and oleoyl sarcosine;
    driving said flooding agent through said reservoir to an output well by injecting a quantity of water sufficient to drive said flooding agent to said output well; and
    recovering petroleum and said flooding agent from said output well.

4. The process of claim 3 wherein said flooding agent contains from .01 to 0.1 weight percent of an oil-soluble surfactant.

5. The process of claim 3, wherein said flooding agent is liquefied petroleum gas.

6. A process for recovering petroleum from an underground reservoir comprising the steps of:
    injecting into an injection well a volume of a flooding agent miscible with said petroleum in the range of 3 to 10 percent of the swept pore volume of said reservoir, said flooding agent containing from .001 to 2 weight percent of oleoyl sarcosine;
    driving said flooding agent through said reservoir to an output well by injecting a quantity of water sufficient to drive said flooding agent to said output well; and
    recovering petroleum and said flooding agent from said output well.

7. The process of claim 6 wherein said flooding agent contains from .01 to 0.1 weight percent of oleoyl sarcosine.

8. The process of claim 6, wherein said flooding agent is liquefied petroleum gas.

References Cited by the Examiner

UNITED STATES PATENTS

| | | | |
|---|---|---|---|
| 2,790,779 | 4/57 | Spivack et al. | 252—392 |
| 2,812,817 | 11/57 | Sayre | 166—9 |
| 2,875,831 | 3/59 | Martin | 166—9 |
| 3,082,822 | 3/63 | Holm et al. | 166—9 |

FOREIGN PATENTS 459,039   12/36   Great Britain.

OTHER REFERENCES

Zussman: "Acylated Amino Acids in Shampoos," Journal of the Society of Cosmetic Chemists, vol. 6, No. 5, December 1955, pages 407 to 415.

McCutcheon, J. W., "Surfactants Listed . . .," 1958, McNair-Dorland Co., Inc. (page 56 relied upon).

BENJAMIN HERSH, *Primary Examiner.*

BENJAMIN BENDETT, *Examiner.*